(12) United States Patent
Hsu et al.

(10) Patent No.: US 7,461,101 B2
(45) Date of Patent: Dec. 2, 2008

(54) METHOD FOR REDUCING DATA LOSS AND UNAVAILABILITY BY INTEGRATING MULTIPLE LEVELS OF A STORAGE HIERARCHY

(75) Inventors: Windsor Wee Sun Hsu, San Jose, CA (US); Shauchi Ong, San Jose, CA (US); John Davis Palmer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/890,920

(22) Filed: Jul. 13, 2004

(65) Prior Publication Data

US 2006/0015767 A1    Jan. 19, 2006

(51) Int. Cl.
G06F 12/00 (2006.01)
G06F 17/30 (2006.01)

(52) U.S. Cl. .................................. 707/204; 707/200
(58) Field of Classification Search ................... None
See application file for complete search history.

(56) References Cited

U.S. PATENT DOCUMENTS

| | | | |
|---|---|---|---|
| 5,835,953 A * | 11/1998 | Ohran | 711/162 |
| 6,092,213 A * | 7/2000 | Lennie et al. | 714/3 |
| 6,490,676 B1 | 12/2002 | Cota-Robles | |
| 6,671,705 B1 * | 12/2003 | Duprey et al. | 707/204 |
| 7,103,796 B1 * | 9/2006 | Kekre et al. | 714/6 |
| 2002/0046322 A1 | 4/2002 | Butterworth et al. | |
| 2002/0048284 A1 | 4/2002 | Moulton et al. | |
| 2002/0103943 A1 | 8/2002 | Lo et al. | |
| 2002/0188711 A1 | 12/2002 | Meyer et al. | |
| 2003/0028698 A1 | 2/2003 | deBlanc et al. | |
| 2003/0061220 A1 | 3/2003 | Ibrahim et al. | |
| 2003/0084241 A1 | 5/2003 | Lubbers et al. | |
| 2003/0149848 A1 | 8/2003 | Ibrahim et al. | |
| 2003/0182501 A1 | 9/2003 | George et al. | |
| 2003/0200388 A1 * | 10/2003 | Hetrick | 711/114 |
| 2004/0148397 A1 * | 7/2004 | Aronoff et al. | 709/227 |

* cited by examiner

*Primary Examiner*—Khanh B. Pham
*Assistant Examiner*—Thu-Nguyet Le
(74) *Attorney, Agent, or Firm*—Mark C. McCabe; Lewis Nunnelley

(57) ABSTRACT

A method for reducing data loss and unavailability by integrating multiple levels of a storage hierarchy is provided. The method includes receiving a read request. In addition, the method includes recognizing a data failure in response to the read request. The method further includes locating an alternate source of the data to be read in response to recognizing the data failure. The alternate source includes data cached at devices in the storage hierarchy, data in a backup system, and cumulative changes to the data since the last backup. Moreover, the method includes responding to the read request with data from the alternate source.

1 Claim, 7 Drawing Sheets

US 7,461,101 B2

METHOD FOR REDUCING DATA LOSS AND UNAVAILABILITY BY INTEGRATING MULTIPLE LEVELS OF A STORAGE HIERARCHY

FIELD OF THE INVENTION

This disclosure describes an invention that addresses data loss and unavailability through integration of multiple levels of a storage hierarchy. The integration includes utilizing data cached at devices in the storage hierarchy, data which has been backed up to a backup system, and a combination of the data backed up to the backup system and all cumulative changes to the data since the last backup.

BACKGROUND OF THE INVENTION

Data is one of the most important asset of an organization especially as organizations rely more and more on data processing systems for their daily operations. Any loss of data or even loss of access to the data is therefore potentially very costly. For example, an hour of down time for a system handling brokerage operations has been estimated to cost eight million dollars. Current methods for preventing data loss include using redundant arrays of disk such as RAID. RAID protection alone is, however, not sufficient or cost effective at preventing data loss, especially in view of the following trends:

More and more disks are being grouped into an array, thereby increasing the chances of having data loss situations (e.g., multiple failures within an array).

Disks are growing in capacity faster than they are improving in data rate. As a result, the time to rebuild a disk is increasing over time, and this lengthens the window during which the array could be vulnerable to data loss.

Disk vendors are continuing to push areal density aggressively. Historically, this has caused a reduction in disk reliability which we expect will continue in the future.

System vendors are increasingly interested in building cost-effective storage systems with low-end desktop disks, which are generally regarded as being less reliable.

Widespread deployment of techniques like virtualization, which can spread a host LUN across many disk arrays, increase the impact to the user of a data loss situation because many more host LUNs could be impacted.

RAID protection is typically augmented by periodically copying the data onto a secondary system such as a tape library in a process referred to as backing up. When the primary copy of the data fails, the data can be retrieved from the secondary system through a process called restore. However, the process of recovering data from the back-up copy tends to take at least several hours, even if the failure affects only a small number of blocks. This is because the disk array and the back-up system are not integrated so that a lot of data has to be unnecessarily retrieved from the back-up system. For instance, the minimum unit of recovery from the back-up system is typically a LUN or at least a database table. The result is that critical data is not available for long periods of time. Moreover, the data written after the last back up cannot be recovered from the back up, and is likely to be lost. In certain database environments where the log of all transactions is carefully kept, the database can be brought up to date by replaying the log. Doing so, however, requires a lot of operator involvement, is very time consuming and uses expensive host MIPS.

SUMMARY OF THE INVENTION

According to the present invention, there is provided a method for reducing data loss and unavailability by integrating multiple levels of a storage hierarchy. The method includes receiving a read request. In addition, the method includes recognizing a data failure in response to the read request. Also, the method includes locating an alternate source of the data to be read in response to recognizing the data failure. Moreover, the method includes responding to the read request with data from the alternate source. In a preferred embodiment, the alternate source includes caches in the storage hierarchy, the backup system, and a secondary storage system containing the cumulative changes to the data since the last backup.

According to the present invention, there is also provided a computer program product having instruction codes for reducing data loss and unavailability in a system by integrating the multiple levels of storage hierarchy. The computer program product includes a set of instruction codes for receiving a read request. In addition, the computer program product includes a set of instruction codes for recognizing a data failure in response to the read request. Also, the computer program product includes a set of instruction codes for locating an alternate source of the data to be read in response to recognizing the data failure. Moreover, the computer program product includes a set of instruction codes for responding to the read request with data from the alternate source. In a preferred embodiment, the alternate source includes caches in the storage hierarchy, the backup system, and a secondary storage system containing the cumulative changes to the data since the last backup.

According to the present invention, there is also provided a method for deploying a service for reducing data loss and unavailability in a system by integrating the multiple levels of storage hierarchy. The method includes integrating computer readable code into a system for receiving a read request. Also, the method includes integrating computer readable code into the system for recognizing a data failure in response to the read request. In addition, the method includes integrating computer readable code into the system for locating an alternate source of the data to be read in response to recognizing the data failure. Moreover, the method includes integrating computer readable code into the system for responding to the read request with data from the alternate source. In a preferred embodiment, the alternate source includes caches in the storage hierarchy, the backup system, and a secondary storage system containing the cumulative changes to the data since the last backup.

DETAILED DESCRIPTION

The invention will be described primarily as a system and method for minimizing data loss and unavailability through intelligent integration of multiple levels of the storage hierarchy. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
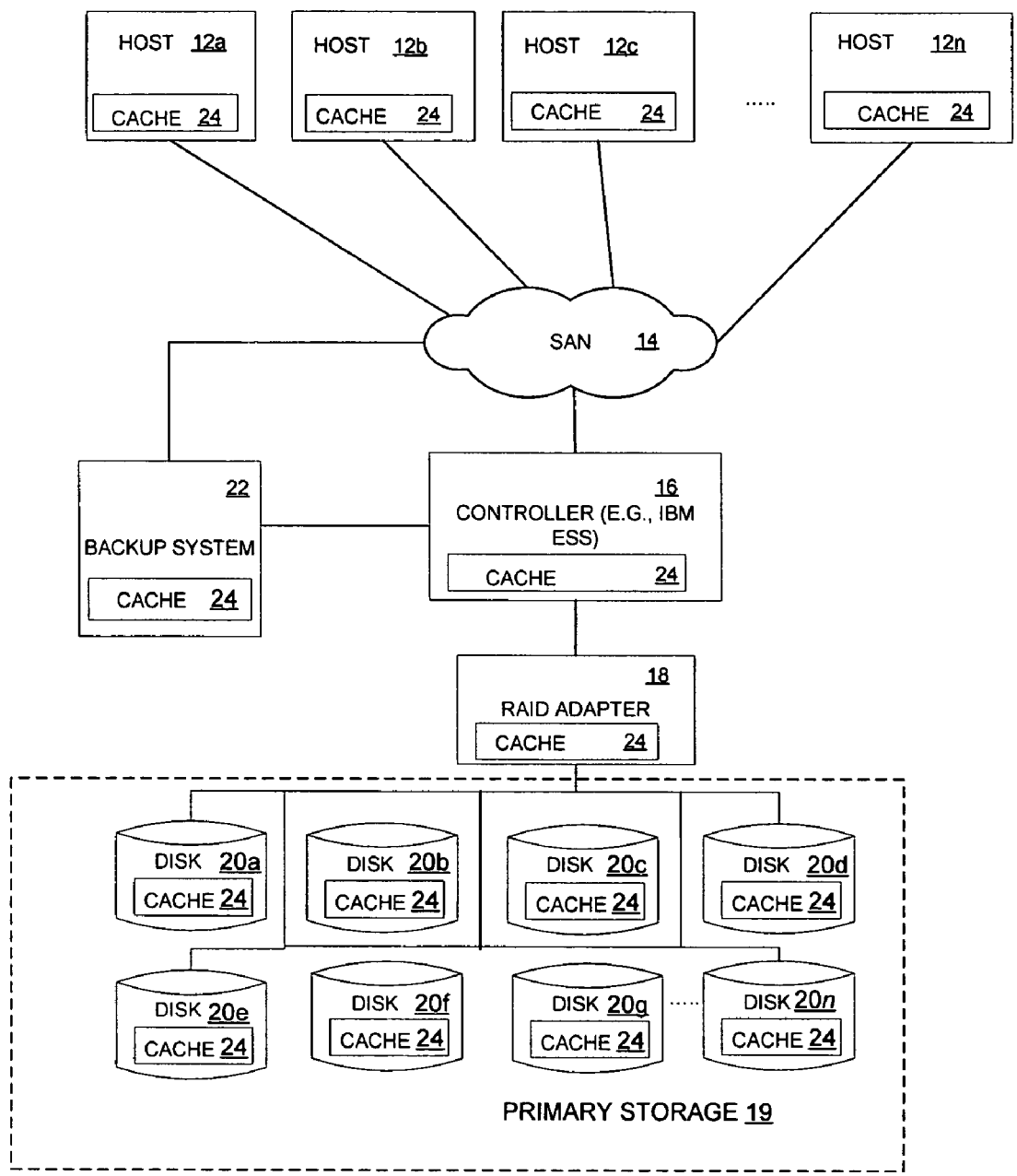
FIG. 1 shows multiple levels of a storage hierarchy.

FIG. 1 is a block diagram illustrating a storage hierarchy 10. In hierarchy 10, data is stored and accessed by applications running at host 12a, 12b, 12c . . . 12n (hereinafter host 12). Host 12 is attached to storage area network 14 (SAN 14). SAN 14 is attached to storage controller 16 (e.g., Enterprise Storage Server by IBM). Attached to controller 16 is RAID adapter 18 which manages RAID array 19. RAID array 19 includes disks 20a through 20n(hereinafter disk 20). Also, hierarchy 10 includes backup system 22. Backup system 22 can be attached to SAN 14 or controller 16. Moreover, backup system 22 can be geographically separated from the rest of hierarchy 10. Cache 24 is included within each device in hierarchy 10, where each device includes host 12, controller 16, RAID adapter 18, disk 20 and backup system 22.

Figure 2:
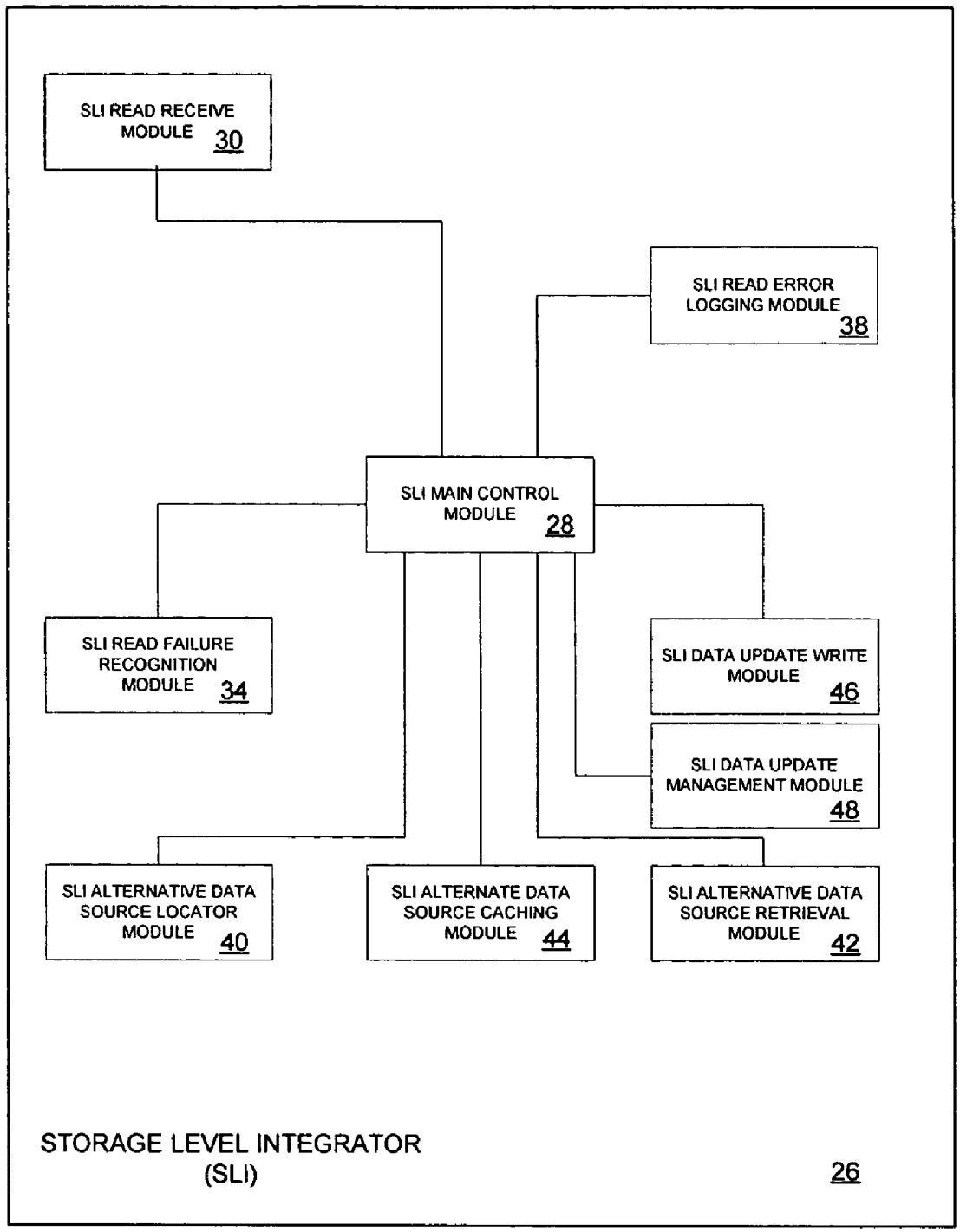
FIG. 2 shows a block diagram of a storage level integrator program, according to an exemplary embodiment of the invention.

FIG. 2 is a block diagram illustrating a storage level integrator program 26, according to an exemplary embodiment of the invention. SLI 26 includes SLI main control module 28. SLI main control module 28 coordinates the functions and interactions of all the modules included within SLI 26.

SLI 26 includes SLI read receive module 30. SLI read receive module 30 identifies all read requests made to hierarchy 10.

SLI 26 includes SLI read failure recognition module 34. SLI read failure recognition module 34 monitors hierarchy 10 for read failures associated with read requests identified by SLI read receive module 30.

SLI 26 includes SLI read error logging module 38. SLI read error logging module 38 records information associated with recognized read error, identified by read failure recognition module 34. The recorded information includes identity information associated with the data requested.

SLI 26 includes SLI alternative data source locator module 40. SLI alternative data source locator module 40 utilizes the information recorded by read error logging module 38 to search for an alternate source of the data associated with read failure, identified by SLI read failure recognition module 34.

SLI 26 includes SLI alternative data source retrieval module 42. In response to a read error, SLI alternative data source retrieval module 42 retrieves an alternate copy of data identified by SLI alternative data source locator module 40.

SLI 26 includes SLI alternate data source caching module 44. SLI alternate data source caching module 44 caches a copy of the data retrieved by SLI alternate data source retrieval module 42, at the device (e.g., controller 16, disk 20, etc.) where the read error was recognized, or at the device where SLI 26 is installed, or both.

SLI 26 includes SLI data update write module 46. SLI data update write module 46 records the addresses identifying the data that has been written (e.g., initial data write and data updates). It also writes a copy of all the data written to a secondary storage location (not shown). The secondary storage location is different than primary storage 19.

SLI 26 includes SLI data update management module 48. SLI data update management module 48 is responsible for maintaining the addresses identifying the data that has been written and the copies of data written to secondary storage by SLI data update write module 46. Maintaining the addresses and the copies of data includes adding and deleting addresses and copies of data as necessary.

Figure 3:
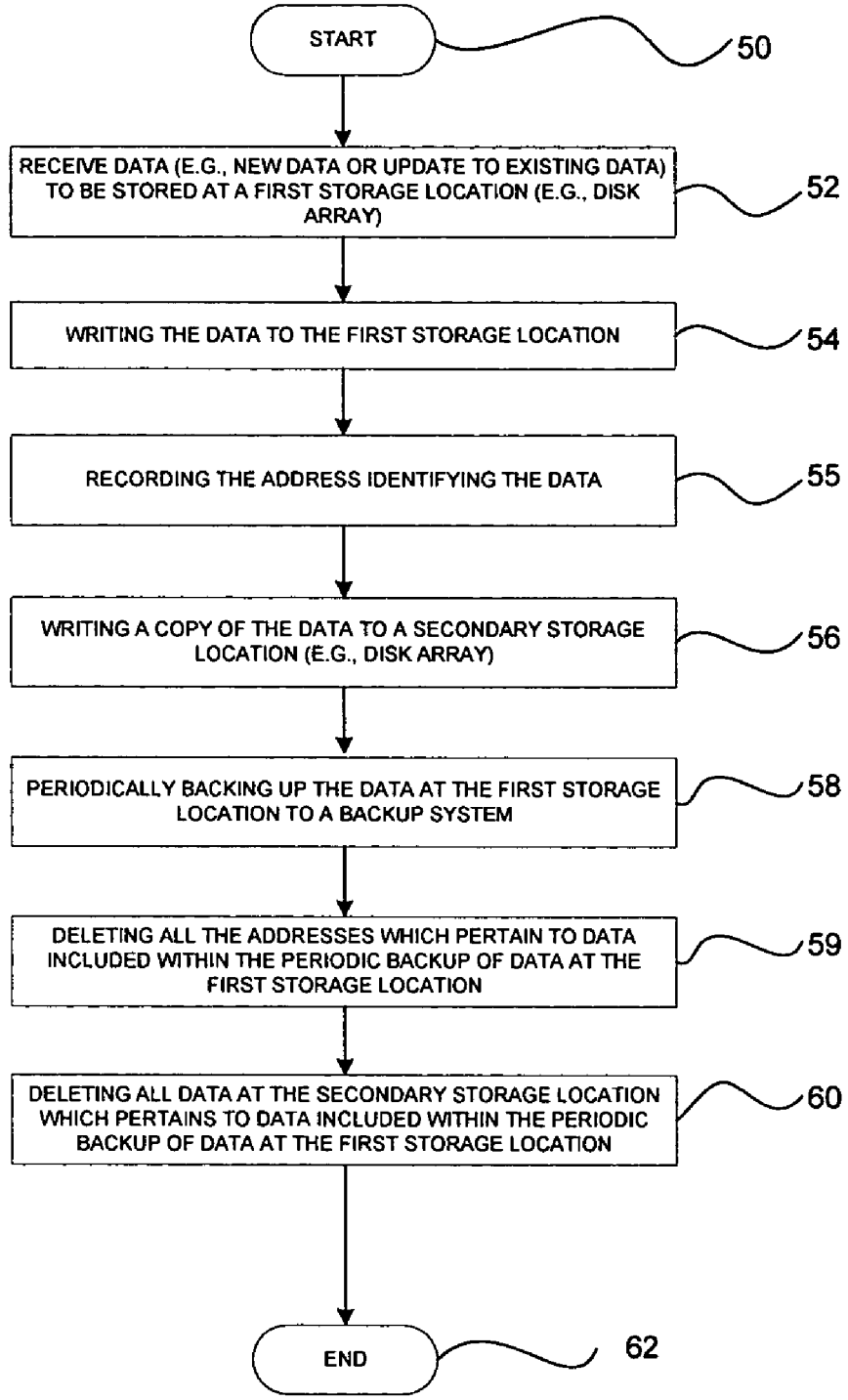
FIG. 3 illustrates a method of maintaining records of individual updates made to data at a storage location, according to an exemplary embodiment of the invention.

FIG. 3 is a flowchart illustrating a method 48 of maintaining records of individual updates made to data at primary storage 19, according to an exemplary embodiment of the invention.

At block 50, method 48 begins.

At block 52, data to be stored at primary storage 19 is received as a data write request at hierarchy 10. The received data may be new data to be written or an update to existing data at primary storage 19.

At block 54, the received data is written to primary storage 19.

At block 55, the address identifying the received data is recorded. In a preferred embodiment, the address is recorded in a bitmap wherein each bit indicates whether a corresponding block of data has been written to.

At block 56, a copy of the received data is written to a secondary storage location (e.g., disk array). In an exemplary embodiment, the secondary storage location maintains only the most recent version for each written block. In other words, the secondary storage location stores the cumulative changes.

At block 58, the data at primary storage 19 is backed up. In the preferred embodiment, backing up the data includes sending the data to backup system 22, and backup system 22 moving the data to low-cost storage media such as tape or archival disk. In another embodiment, the backup system at 22 is a remote mirror of the primary storage 19 and can be used to continue normal operations in case of a disaster at primary storage 19.

At block 59, the addresses associated with the data that is backed up to system 22 is removed from the records and at block 60, the corresponding copies of data at the secondary storage location are deleted. There is no longer a need to maintain the data at the secondary storage location, because a permanent copy of the data has been made (e.g., tape archive) at backup system 22. Moreover, by deleting the data, the size of the secondary storage location can be kept small and management and access of the secondary storage location is thereby simplified.

At block 62, method 48 ends.

To speed up the backup process, hierarchy 10 can utilize the records of updated data generated during method 48 (block 55) to backup only the blocks that have changed since the last backup. In addition, this incremental backup process can be optionally triggered whenever an event increases the vulnerability of hierarchy 10 to data loss (e.g., when one of the disks in a RAID-5 array fails).

Figure 4:
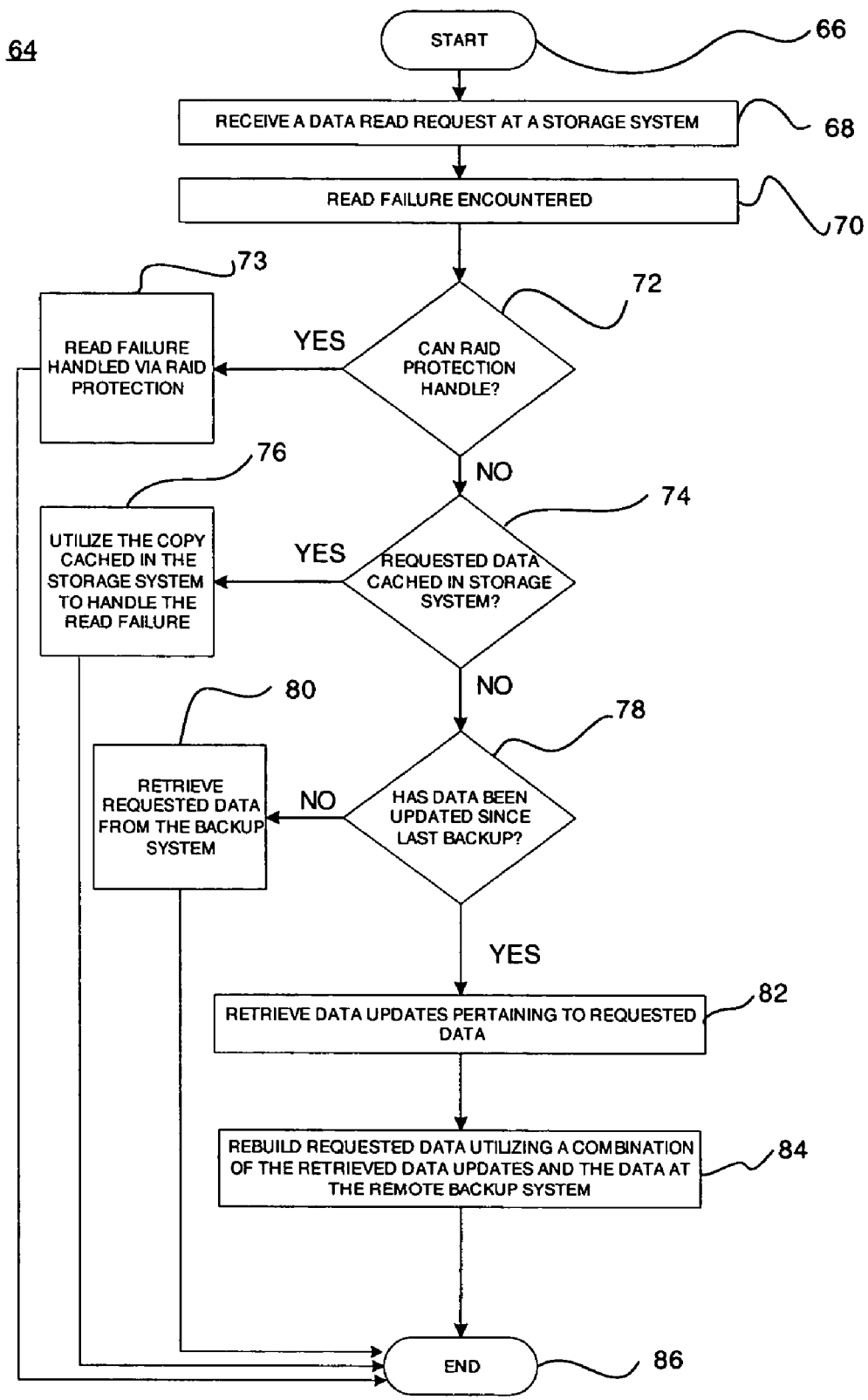
FIG. 4 illustrates a method of utilizing cached data in a storage hierarchy as an alternate source for data, in response to a read failure, according to an exemplary embodiment of the invention.

FIG. 4 is a flowchart illustrating a method 64 of utilizing cached data in a storage hierarchy as an alternate source for data, in response to a read failure, according to an exemplary embodiment of the invention.

At block 66, method 64 begins.

At block 68, a data read request is received at storage hierarchy 10.

At block 70, a read failure associated with the block 68 data read request is encountered.

At block 72, a determination is made as to whether RAID protection within hierarchy 10 can handle the encountered read failure. If yes, then at block 73, the read failure is addressed via hierarchy 10 RAID protection.

Returning to block 72. If no, then at block 74, a determination is made as to whether a copy of the requested data exists within a device (e.g., host 12, controller 16, RAID adapter 18, etc.) cache 24 in hierarchy 10. If yes, then at block 76, the cached copy is utilized to handle the read failure. In a preferred embodiment, the upstream levels of storage hierarchy 10 (e.g., host 12, controller 16) are signaled through an appropriate API to write their cache contents back to the device (e.g. RAID adapter 18) in storage hierarchy 10 at which the read failure was encountered.

For example, the RAID adapter 18 could raise S.M.A.R.T. (Self-Monitoring and Analysis Technology) alerts to notify the upstream levels of the storage hierarchy 10 to check for potential problems. In particular, the SCSI specification provides for a sense bit to be flagged to notify the end user/administrator of impending reliability issues. On receiving such notifications, the devices that are upstream could write their cache contents back to the device initiating the notifications. Importantly, this is different than a typical "sync" operation which only writes back modified state. If the requested data is included within the data written back, the read failure can be repaired.

Alternatively, when the upstream levels receive such notifications, they query the initiating device for more details such as the addresses of the error blocks. If an upstream device finds that it has a copy of an error block, it writes the block back to the initiating device. If an upstream device finds that an error block has not actually been allocated or used for storing data yet, it writes some arbitrary, preferably blank, block back to that address. In an exemplary embodiment, an upstream device may map an error block to the object (e.g. file, database table) that the block belongs to. It may then retrieve the relevant object from the backup system, extract the particular block, and write it to the initiating device.

Note that cache contents is used in the general sense to include state that is derived from the data stored in the hierarchy. Examples of such state in host 12 includes mapping information of files and database tables, volume maps, and other metadata information that may be pinned in memory. In addition, the cache in host 12 could include the file system buffer, the database buffer pool or other application managed buffers. In an exemplary embodiment, some of the caches and state information are held in MRAM or another non-volatile memory and continue to be available even when there has been a loss of power.

Given that key metadata are replicated in memory, and that caches are huge and increasing in size and contain the data most recently and/or frequently used, this approach of using the cache contents to repair data failures virtually eliminates loss of active and/or critical data.

Note that within storage hierarchy 10, an attempt may be made to read a block that is already cached upstream because it could be servicing requests from multiple hosts (or applications). In addition, data recovery operations such as RAID rebuild require the reading of stored data that could be cached upstream. In fact, many data loss situations in RAID-5 arrays result form one complete disk failure and a subsequent failed sector read (kill stripe) on another disk during rebuild. Here, the repairing of read failures by utilization of the data maintained upstream (e.g., cache 24) dramatically reduces such data loss situations.

Returning to block 74. If no, then at block 78, a determination is made as to whether the requested data (e.g., block) has been updated since the last time the data was backed up. In current systems, when a read failure is encountered, the operator has to retrieve the entire contents of the affected LUN or at least the affected file or database table from backup system 22. After a long retrieval process, the system contains the data at the time the last backup was performed. It might be possible to merge the recovered data with whatever data could be salvaged from the device reporting the failure, but typically, the updates since the last backup are lost. Even if merging were possible, there is still uncertainty as to whether any data has been lost because the system cannot tell whether the failed data has been updated since the last backup.

Returning to block 78. If no, then at block 80, the requested data is retrieved from backup system 22.

If yes, then at block 82, all updated data pertaining to the requested data, which have yet to be backed up, are retrieved from the secondary storage location. As explained above (see FIG. 3), the invention keeps track of what data (e.g., which data blocks) have been updated since the last backup to backup system 22 was performed.

At block 84, the requested data is rebuilt utilizing a combination of the retrieved data updates from the secondary storage location and the most recently backed up copy of the data from backup system 22. In the exemplary embodiment, the secondary storage location is in a failure domain which is independent of primary storage 19, and the secondary storage location is optimized for reliability and write performance. Since only a small percentage of a storage system's (e.g., storage hierarchy 10) data is updated in a day, the secondary storage location can be very small.

In cases where a lot of data has to be recovered from backup system 22 (e.g., multiple concurrent disk failures in a RAID-5 array), it is more efficient to first recover the data in bulk from backup system 22 and to then apply the updates retrieved from the secondary storage location.

At block 86, method 64 ends.

It should be clear that by utilizing cache 24, backup system 22, or the data changes maintained in the secondary storage location, data loss and unavailability can be dramatically reduced. In combination, they can provide even greater effectiveness. When used in combination, it should be apparent that the methods can be used in order of increasing cost. For example, it would be advantageous to first attempt to locate the data locally in a device cache before resorting to a remote backup system.

While the invention has been described using specific storage devices (e.g., disk 20, semiconductor memory, tape, etc.) and storage systems (e.g., tape library, disk array, etc.), it should be apparent that the same ideas of integrating multiple levels of storage hierarchy 10 apply when the hierarchy is made up of other storage devices/systems (e.g., MRAM, MEMS) or other combinations of storage devices/systems. In addition, the methods can be implemented in various components that mange some aspects of the storage hierarchy, including the host operating system, file system, database system, storage controller, RAID adapter, disk, etc.

Figure 5:
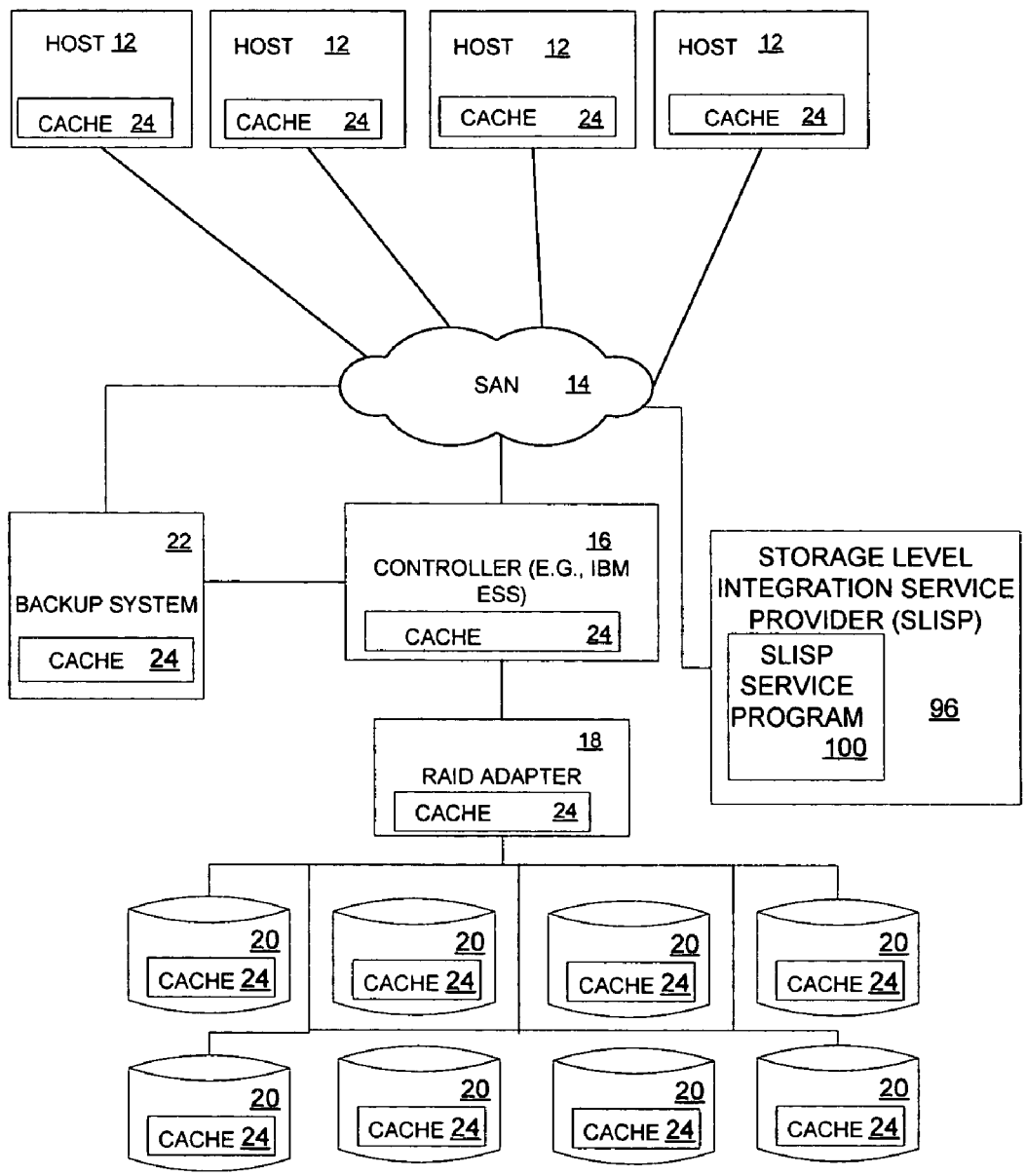
FIG. 5 shows multiple levels of a storage hierarchy, including a storage level integration service provider (SLISP).

FIG. 5 is a block diagram illustrating a storage hierarchy 94 capable of communicating with a storage level integration service provider (SLISP) 96. Storage hierarchy 94 is the same as storage hierarchy 10 described above, with the addition of SLISP 96. SLISP 96 is responsible for providing a service to storage hierarchy 96, via the SLISP service program 100, for addressing read failures. The service provided by SLISP service program 100 includes the functionality and process described within FIG. 2, FIG. 3, and FIG. 4.

Figure 6:
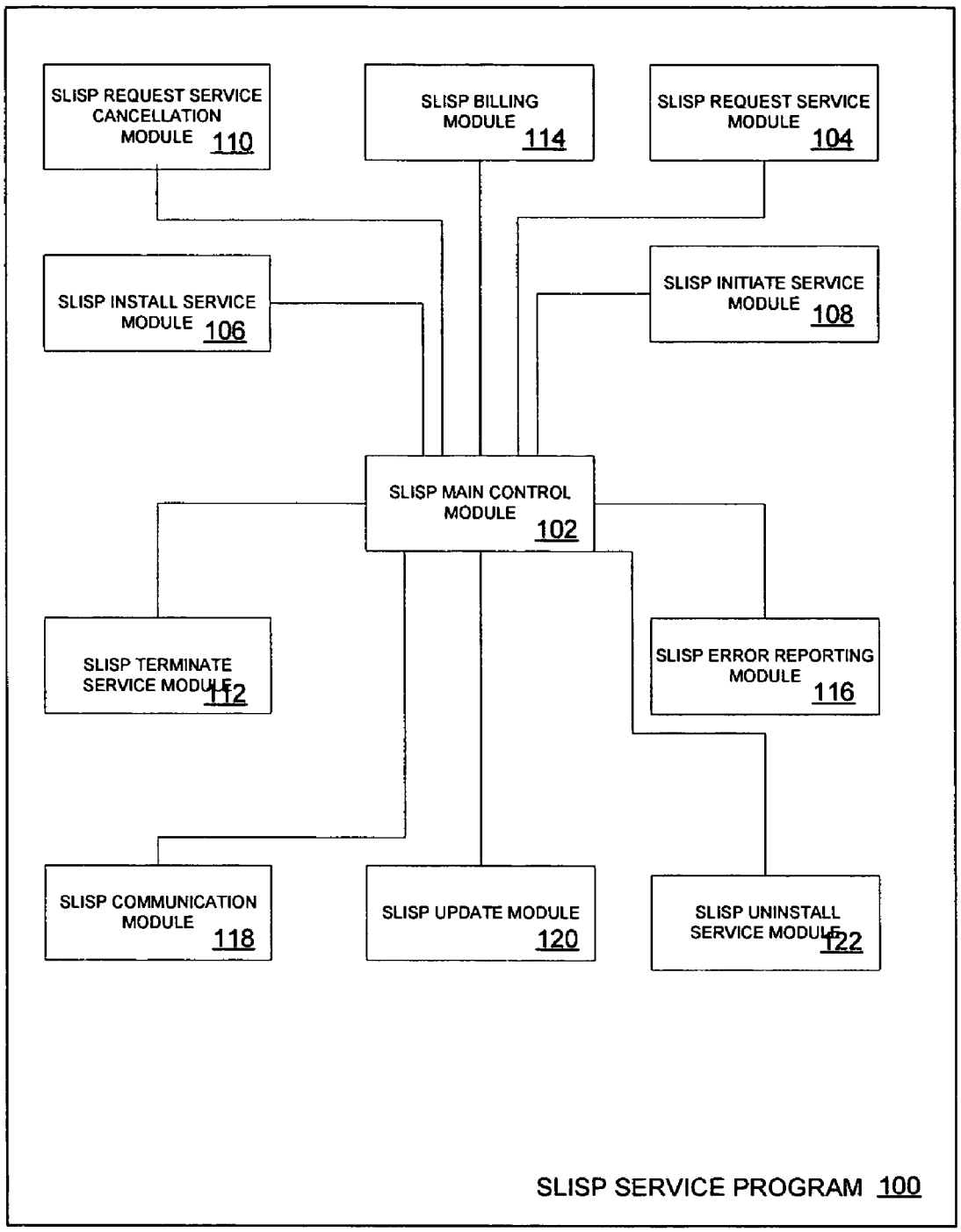
FIG. 6 shows a block diagram of a storage level integrator service (SLIS) program, according to an exemplary embodiment of the invention.
Figure 7:
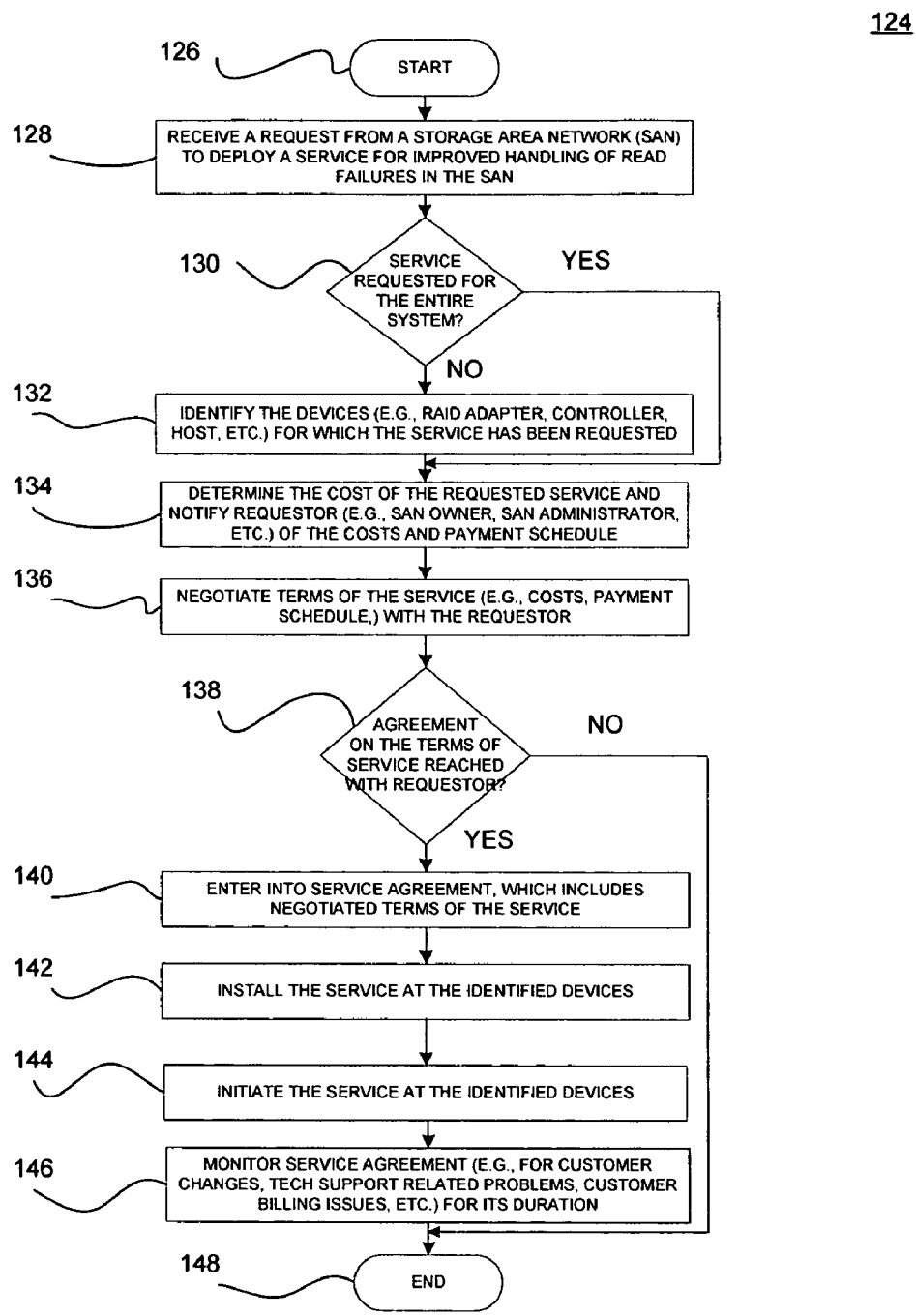
FIG. 7 illustrates a method of utilizing cached data in a storage hierarchy as an alternate source for data, in response to a read failure, according to an exemplary embodiment of the invention.

FIG. 6 is a block diagram, illustrating SLISP service program 100, according to an exemplary embodiment of the invention.

SLISP service program 100 includes SLISP main control module 102. SLISP main control module 102 coordinates the functions and interactions of all the modules included within SLISP 100.

SLISP service program 100 includes SLISP request service module 104. The SLISP request service module 104 receives and processes requests to receive services provided by SLISP service program 100.

SLISP service program 100 includes SLISP install service module 106. SLISP install service module 106 is responsible for installing the services provided by SLISP service program 100 within a requesting system (e.g., storage hierarchy 94). The installation includes installing all components of SLI 26 within the requesters system.

SLISP service program 100 includes SLISP initiate service module 108. SLISP initiate service module 108 is responsible for negotiating the service agreement with the requestor and initiating the service provided by SLISP service program 100.

SLISP service program 100 includes SLISP request service cancellation module 110. SLISP request service cancellation module 110 is responsible for processing all requests to cancel service provided by SLISP service program 100.

SLISP service program 100 includes SLISP terminate service module 112. SLISP terminate service module 112 is responsible for negotiating the termination of services provided by SLISP service program 100 and making the termination of service effective.

SLISP service program 100 includes SLISP billing module 114. SLISP billing module 114 is responsible for managing all account and billing information between the requestor and SLISP service program 100 offered by SLISP 96.

SLISP service program 100 includes SLISP error reporting module 116. SLISP error reporting module 116 is responsible for monitoring SLISP service program 100 within each requestors system and receiving and processing all error messages.

SLISP service program 100 includes SLISP communication module 118. SLISP communication module 118 provides for monitoring and maintaining communications between SLISP service program 100 and storage hierarchy 94.

SLISP service program 100 includes SLISP update module 120. SLISP update module 120 facilitates the updating and/or upgrading of the software installed at hierarchy 94 by SLISP install service module 106.

SLISP service program 100 includes SLISP uninstall service module 122. SLISP uninstall service module 122 is responsible for uninstalling software installed at hierarchy 94 by SLISP install service module 106. Uninstall might be necessary upon termination of a requestor's service.

What is claimed is:

1. A method for reducing data loss in a system having a storage hierarchy, comprising:
   receiving a read request for read data;
   recognizing a data failure in a storage device in response to the read request;
   determining if RAID protection can handle the data failure;
   searching for a cached source of the read data in response to recognizing the data failure if said RAID protection can not handle the data failure;
   writing the read data in cache back to the storage device in which a data failure occurred if the read data was found in cache;
   determining if the read data containing the error has been allocated for storing;
   writing a blank data block back to the device in which a data failure occurred if the read data containing the error has not been allocated;
   retrieving the read data from a backup system if the cached source of the data is unavailable;
   determining if the read data has been updated since the last backup;
   determining read data updates pertaining to the read data; and
   rebuilding the read data utilizing a combination of the retrieved data updates and the data from the alternate source.

* * * * *